United States Patent
Barnard et al.

(10) Patent No.: US 7,160,232 B2
(45) Date of Patent: Jan. 9, 2007

(54) COIL SPRING CONNECTOR FOR USE IN AN EXERCISE APPARATUS

(75) Inventors: Edward D. Barnard, Roseville, CA (US); Thad A. Tomlinson, Hortonville, WI (US)

(73) Assignee: Balanced Body, Inc., Sacramento, CA (US)

( * ) Notice: Subject to any disclaimer, the term of this patent is extended or adjusted under 35 U.S.C. 154(b) by 51 days.

(21) Appl. No.: 10/921,537

(22) Filed: Aug. 18, 2004

(65) Prior Publication Data

US 2006/0040804 A1  Feb. 23, 2006

(51) Int. Cl.
*A63B 21/02* (2006.01)

(52) U.S. Cl. ............... 482/121; 482/127; 16/72

(58) Field of Classification Search ........... 482/148, 482/121; 267/33, 166, 166.1, 168, 169, 179, 267/259, 288; 16/72, 75, 76, 400, 401; 292/DIG. 1; 248/317, 339, 340, 304
See application file for complete search history.

(56) References Cited

U.S. PATENT DOCUMENTS

| | | | | |
|---|---|---|---|---|
| 5,004,216 A | * | 4/1991 | Boudreau | 267/179 |
| 5,232,207 A | * | 8/1993 | Champ et al. | 267/70 |
| 5,399,139 A | * | 3/1995 | Malynowsky | 482/129 |
| 6,090,018 A | * | 7/2000 | Laudenslager et al. | 482/87 |
| 6,926,747 B1 | * | 8/2005 | Udwin | 48/126 |
| 2004/0209743 A1 | * | 10/2004 | Perez | 482/83 |

OTHER PUBLICATIONS

May 16, 2001, Fox Valley Spring Company; Part Drawing No. FV0008736; Jeff Schmiedlin.

* cited by examiner

*Primary Examiner*—Lori Amerson
(74) *Attorney, Agent, or Firm*—John R. Wahl; Greenberg Traurig, LLP

(57) ABSTRACT

A spring connecting apparatus is disclosed for use in an exercise apparatus that has one or more springs fastened between a movable member and a stationary member. The connector apparatus is adapted to fasten one end of a spring to one of the members. This apparatus includes an elongated connecting member having a head end and a foot end, a polymer stopper body adapted to fit within one end of a coil spring, the body having an axial bore through which the foot end of the connecting member extends, and a washer disc on the connecting member between the polymer stopper body and a deformed section of the connecting member near the foot end.

7 Claims, 2 Drawing Sheets

COIL SPRING CONNECTOR FOR USE IN AN EXERCISE APPARATUS

BACKGROUND OF THE INVENTION

1. Field of the Invention

This invention generally relates to resistance based exercise equipment and more particularly to a spring connector for connecting a coil spring between members in a spring biased resistance exercise machine such as in a Pilates chair and reformer.

2. Description of Related Art

Today, many types of exercise equipment are available and used for fitness and/or medical reasons to burn off undesired calories, to improve cardiovascular ability, to tone or strengthen muscles, or to improve flexibility, balance, posture, etc. No matter what the desired end goal of a user of exercise equipment may be, almost all types of exercise equipment aid the user to achieve his or her desired goal by exerting some form of adequate and effective resistance against repeated bodily movements of the user.

Many of these exercise devices utilize elastic resistance members such as coil springs. A hook is often used to connect each of the two ends of the coil spring (or generally a force resisting mechanism) between a movable and a fixed location on the exercise equipment.

A reformer is one such exercise device that is basically a rectangular frame that sits on a floor and constitutes or carries a pair of stationary parallel rails or tracks. A rollable carriage for supporting a user's body is mounted on the rails for movement toward and away from one end, the foot end, of the frame. The carriage is typically elastically biased toward the foot end of the frame by one or more coil springs attached to the carriage and to an anchor bar near the foot end of the frame.

Another exercise apparatus is a Pilates combo chair. The chair is a boxlike structure that has a pair of spring biased pivot arms attached thereto. The box structure is designed to rest on a horizontal surface such as a floor. Each of the pivot arms has one end fastened to an inside wall of the box. The free end of the pivot arm has a foot step/support pad mounted thereon. A user typically stands on the floor and steps or presses downward on the step pad at the free end of the pivot arm with his or her foot. Alternatively, the user may sit on the box and with foot or hand rotate the arm downward against tension provided by one or more coil springs attached between an anchor point on the arm and an anchor point inside the box in order to perform various exercise movements.

Each coil spring has a generally cylindrical spiral outer shape, with tapered coils at each end. One end of each coil spring has a bent rod connector in the form of a hook. The other end of each coil spring typically also has a hook that must be inserted into the eye of an eyebolt fastened to an anchor point.

Each end of the coil spring carries a bent rod connector in the end of the coil forming either the hook or an eye at its distal or head end. The bent rod connector, typically made of spring steel, has a frustoconical metal stopper grommet threaded onto its foot end. The end of the foot end of the bent rod threads through the end coils of the spring and is then squashed into a generally rectangular shape that then locks the metal grommet onto the foot end of the bent rod, inside the end of the coil spring. Several coil turns at the end of the coil spring have a reduced diameter, giving the ends of the spring a conical shape. These turns engage the grommet to hold the foot end of the bent rod connector in the end of the coil spring. During extension and contraction of the spring, some noise may be generated by the expanding coils of the spring interacting with the foot end of the hook as the spring approaches or departs from a relaxed condition. Such noise may be distracting to the user of the exercise apparatus. Thus there is a need for a device that securely but silently connects such a hook or other fastening member to an end of a coil spring in an exercise apparatus.

SUMMARY OF THE INVENTION

Against this backdrop the present invention has been designed. A preferred embodiment of the present invention is a spring connector carried in each end of a coil spring that has an elongated connecting member having a head end and a foot end, a polymer stopper body adapted to fit within the end of the coil spring and having an axial bore through which the foot end of the connecting member extend. A washer disc is positioned on the connecting member between the polymer stopper body and a deformed section of the connecting member near the foot end. This deformed section retains the washer and the stopper body on the connecting member. An interference fit between the stopper body and the reduced diameter end coils of the coil spring retain the connecting member within the end of the coil spring. When the spring is extended and is relaxed, these reduced diameter end coils expand and contract noiselessly against the polymer stopper body, thereby preventing objectionable noise from being generated.

These and other features, advantages and objects of the invention will become more apparent from a reading of the following detailed description when taken in conjunction with the accompanying drawings.

DETAILED DESCRIPTION OF THE INVENTION

Figure 1:
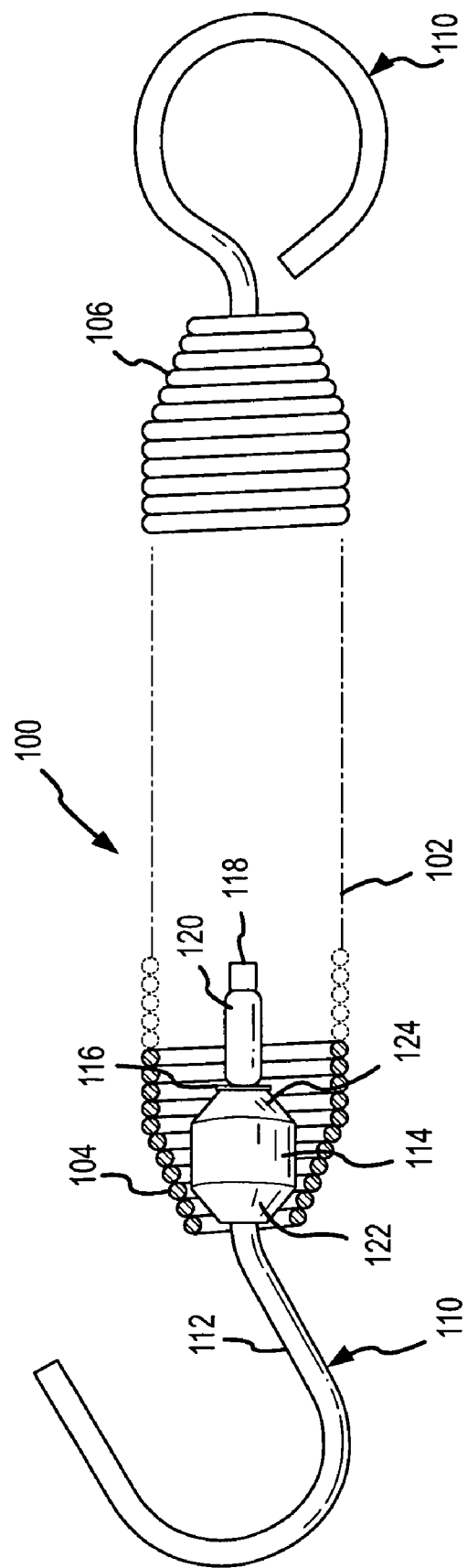
FIG. 1 is a coil spring incorporating a coil spring connector apparatus in accordance with an embodiment of the present invention.

A coil spring 100 in accordance with one embodiment of the present invention is shown in FIG. 1. The spring 100 has an elongated helical coil spring body 102 terminating at tapered coil end portions 104 and 106. Each end portion 104 and 106 has several coil turns each having a progressively reduced diameter so as to present a frustoconical outer shape. A connecting apparatus 110 in accordance with the present invention fits within and extends out of each end portion 104 and 106.

The apparatus 110 includes an elongated rod body 112, a polymer stopper body 114 mounted on the rod body 112, and a washer 116, all sequentially disposed on the body 112. A The body 112 has a crimped flat region 120 adjacent a foot end 118 thereof to lock the stopper body 114 and the washer 116 on the rod body 112 within the tapered end portion 104 of the spring 100. A similar connector apparatus 110 is carried at the opposite end portion 106 of the spring 100. However, as shown in FIG. 1, the distal or head end of the elongated rod body 112 in end portion 106 is formed into an eye rather than a hook as in the end portion 104 of the spring 100. Although not shown, the connector apparatus 110 in the end portion 106 is substantially identical to that shown in end portion 104 except for the eye shaped free end.

Each of the stopper bodies 114 has a generally tubular shape with tapered conical end portions 122 and 124. The stopper body 114 is preferably made of The Polymer Company's Nylatron® GS, which is a nylon 6/6 which has a filler of molybdenum disulfide. Other materials may alternatively be used such as DuPont's Delrin®, or other suitable polymer material that is strong, tough, and rigid enough to withstand the spring forces applied.

The washer 116 is preferably a steel washer that abuts the rear tapered portion 124 of the stopper 114 to prevent the crimp 120 from deforming the central bore through the stopper 114 and permitting the stopper to slip off the rear end 118 of the rod 112. Other means for retaining the stopper 114 on the rod 112 may alternatively be utilized instead of the crimp 120. For example, the end 118 may be threaded and a lock nut arrangement installed. Alternatively a cross bore through the end 118 could be provided and a cotter pin installed to hold the washer 116 and stopper 114 in place.

Figure 2:
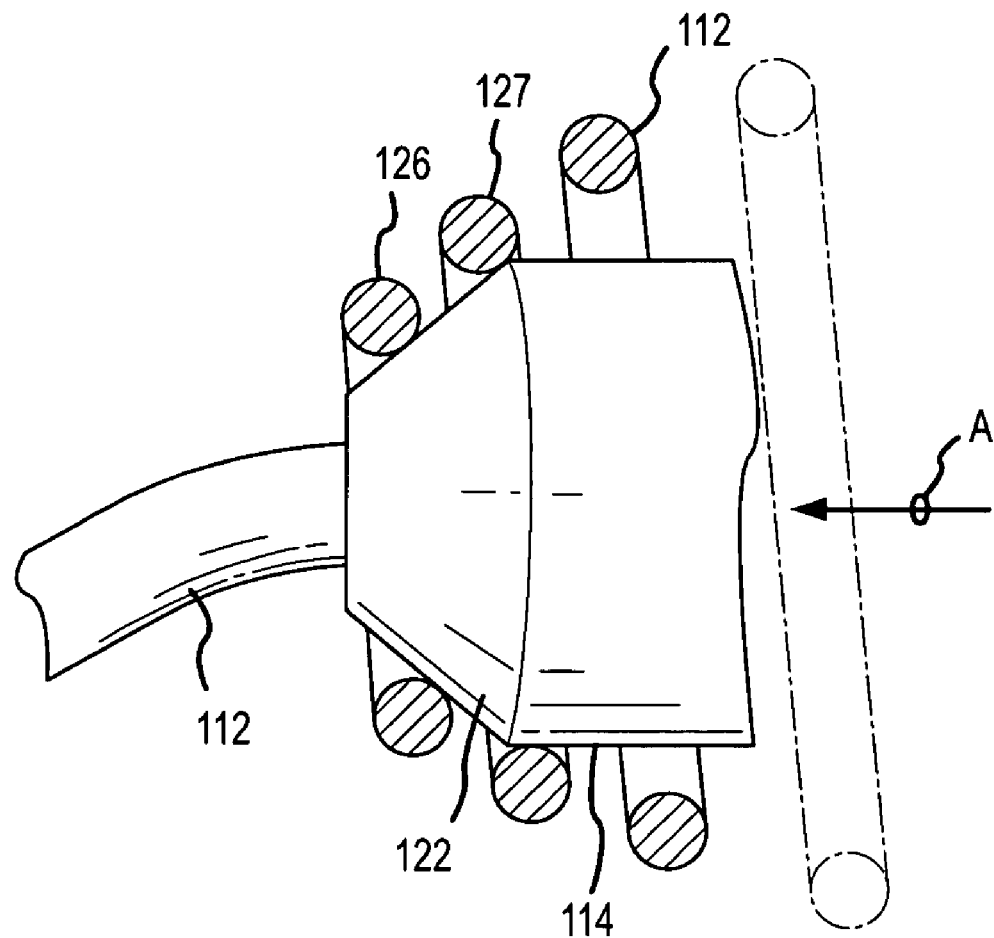
FIG. 2 is an enlarged cross sectional view of part of the coil spring shown in FIG. 1.

The front end 122 of the stopper 114 is tapered so as to distribute the forces of engagement with the end coils 104 of the spring 102 as shown in FIG. 2. FIG. 2 illustrates the force exerted by the stopper 114 on the coils 104 in the direction shown by arrow A. As is shown, the last coils 126 and 127 ride on the tapered surface as the spring extends. Upon retraction, these coils 126 and 127 again ride on the tapered surface of the stopper 114 until fully relaxed. The contact therefore, between the spring body 112 and the connecting apparatus 110, is through the polymeric body of the stopper 114 rather than a metal-to-metal contact. The polymeric body of the stopper 114 is resilient and absorbs shock during movement such that the extension and retraction of the spring 110 becomes substantially silent.

The connecting apparatus 110 is separately formed and assembled. First a straight rod body 112 is inserted into a machine center and the distal end is shaped into a hook or eye shape. The stopper 114 is formed in a separate machine center so that its outer surface is concentric about a central bore through the stopper 114. The straight foot end of the rod body 112 is inserted into and through a stopper 114 along with a washer 116. Finally the crimp 120 is made in the foot end 118 of the body 112 to complete the assembly of the connecting apparatus 110.

The spring body 102 is initially formed with only slightly tapered ends 104 and 106. A completed apparatus 110 is then inserted into each end 104 and 106 of the spring body 102, and then the ends 104 and 106 are compressed to form the final taper configuration as is shown in FIG. 1. This compression completes the assembly of a spring 100 in accordance with the present invention.

The spring 100 constructed in accordance with the present invention reduces the natural stresses that would otherwise occur during extension and relaxation of a spring connected between a stationary member and a movable member. A coil spring naturally wants to rotate when extending. The use of a connecting apparatus 110 in the spring 100 permits the spring 102 to rotate while the hook or eye of the connecting apparatus at each end remains in a constant position. Thus the present invention eliminates the twisting motion that would be exerted on a fixed hook during extension of the spring. This reduces the natural stresses that would otherwise be present with a fixed hook design and greatly increases the longevity of the useful life of the spring 100.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention as set forth in the following claims.

What is claimed is:

1. A spring connecting apparatus for connecting one end of an elongated coil spring to an object, the apparatus comprising:
   an elongated connecting member having a head end and a foot end extending into one tapered coil end of an elongated coil spring;
   a polymer stopper body within the one end of the coil spring, the body having an axial bore through which the foot end of the connecting member extends positioning the stopper body between the connecting member and the tapered coil end of the spring; and
   a washer disc on the connecting member between the polymer stopper body and a deformed section of the connecting member near the foot end of the connecting member, whereby the stopper body prevents contact between the connecting member and the tapered one coil end of the spring during spring extension.

2. A spring connecting apparatus for connecting one end of an elongated coil spring to an object, the apparatus comprising:
   an elongated connecting member having a head end and a foot end;
   a nylon stopper body adapted to fit within one tapered coil end of a coil spring, the body having an axial bore through which the foot end of the connecting member extends positioning the stopper body between the connecting member and the tapered coil end of the spring; and
   a metal washer disc on the connecting member between the polymer stopper body and a flatten crimp section of the connecting member near the foot end of the connecting member, whereby the stopper body prevents contact between the connecting member and the tapered one coil end of the spring during spring extension.

3. A spring connecting apparatus for connecting one tapered coil end of an elongated coil spring to an object, the apparatus comprising:
   an elongated connecting member having a head end and a foot end, the head end having a hook shape;
   a nylon stopper body adapted to fit within one end of a coil spring, the body having an axial bore through which the foot end of the connecting member extends to position the stopper body between the connecting member and the tapered coil end of the spring; and
   a metal washer disc on the connecting member between the polymer stopper body and a flatten crimp section of the connecting member near the foot end of the connecting member; whereby the stopper body prevents contact between the connecting member and the tapered one coil end of the spring during spring extension.

4. A spring connecting apparatus for connecting one end of an elongated coil spring to an object, the apparatus comprising:
   an elongated connecting member having a head end and a foot end, the head end having an eye shape;
   a nylon stopper body adapted to fit within one tapered coil end of a coil spring, the body having an axial bore through which the foot end of the connecting member extends positioning the stopper body between the connecting member and the tapered coil end of the spring; and a metal washer disc on the connecting member between the polymer stopper body and a flatten crimp section of the connecting member near the foot end of the connecting member, whereby the stopper body prevents contact between the connecting member and the tapered one coil end of the spring during spring extension.

5. In an exercise apparatus having one or more coil springs with tapered coil ends fastened between a movable member and a stationary member, a spring connecting apparatus adapted to fasten one tapered coil end of one of the coil springs to one of the members comprising:

an elongated connecting member having a head end and a foot end;

a polymer stopper body within the one tapered coil end of the one of the coil springs, the body having an axial bore through which the foot end of the connecting member extends positioning the stopper body between the connecting member and the tapered coil end of the spring; and a washer disc on the connecting member between the polymer stopper body and a deformed section of the connecting member near the foot end, whereby the stopper body prevents contact between the connecting member and the tapered one coil end of the spring during spring extension.

6. In an exercise apparatus having one or more coil springs fastened between a movable member and a stationary member, a spring connecting apparatus adapted to fasten one tapered coil end of one of the coil springs to one of the members comprising:

an elongated connecting member having a head end and a foot end;

a nylon polymer stopper body within the one tapered coil end of the one of the coil springs, the body having an axial bore through which the foot end of the connecting member extends positioning the stopper body between the connecting member and the tapered coil end of the spring; and a metal washer disc on the connecting member between the polymer stopper body and a deformed section of the connecting member near the foot end, whereby the stopper body prevents contact between the connecting member and the tapered one coil end of the spring during spring extension.

7. In an exercise apparatus having one or more coil springs fastened between a movable member and a stationary member, a spring connecting apparatus adapted to fasten one end of a tapered coil end of one of the coil springs to one of the members comprising:

an elongated connecting member having a head end and a foot end;

a polymer stopper body within the one tapered coil end of the one of the coil springs, the body having an axial bore through which the foot end of the connecting member extends positioning the stopper body between the connecting member and the tapered coil end of the spring; and a washer disc on the connecting member between the polymer stopper body and a flattened crimp section of the connecting member near the foot end, whereby the stopper body prevents contact between the connecting member and the tapered one coil end of the spring during spring extension.

* * * * *